US012566778B2

(12) United States Patent
Wang et al.

(10) Patent No.: US 12,566,778 B2
(45) Date of Patent: Mar. 3, 2026

(54) OPTIMIZING JSON STRUCTURE

(71) Applicant: International Business Machines Corporation, Armonk, NY (US)

(72) Inventors: Jin Wang, Xi'an (CN); Lei Gao, Xian (CN); A Peng Zhang, Xian (CN); Matthew Wayne Howard, Racine, MN (US)

(73) Assignee: International Business Machines Corporation, Armonk, NY (US)

( * ) Notice: Subject to any disclaimer, the term of this patent is extended or adjusted under 35 U.S.C. 154(b) by 1 day.

(21) Appl. No.: 18/437,351

(22) Filed: Feb. 9, 2024

(65) Prior Publication Data

US 2025/0258839 A1     Aug. 14, 2025

(51) Int. Cl.
G06F 16/28          (2019.01)

(52) U.S. Cl.
CPC .......... G06F 16/282 (2019.01); G06F 16/289 (2019.01)

(58) Field of Classification Search
CPC ............................. G06F 16/282; G06F 16/289
See application file for complete search history.

(56) References Cited

U.S. PATENT DOCUMENTS

| | | | |
|---|---|---|---|
| 10,324,904 B2 | 6/2019 | Wu et al. | |
| 10,542,021 B1 | 1/2020 | Mehr | |
| 2005/0119878 A1* | 6/2005 | Haenel ................ | H04M 3/4936 |
| | | | 704/E15.044 |
| 2017/0185662 A1 | 6/2017 | Huang et al. | |

| | | | |
|---|---|---|---|
| 2020/0175010 A1* | 6/2020 | Vaghani .............. | G06F 16/2246 |
| 2021/0109945 A1 | 4/2021 | Sastry et al. | |
| 2021/0319357 A1* | 10/2021 | He .......................... | G06N 20/00 |
| 2023/0118230 A1* | 4/2023 | Tschetter ............ | G06F 16/2471 |
| | | | 707/770 |
| 2023/0376836 A1* | 11/2023 | Komarek ............ | H04L 63/1441 |
| 2024/0160637 A1* | 5/2024 | Bos ....................... | G06F 9/4552 |

FOREIGN PATENT DOCUMENTS

| | | |
|---|---|---|
| CN | 111190900 A | 5/2020 |

OTHER PUBLICATIONS

Miller, Brett N. "Detection of malicious content in JSON structured data using multiple concurrent anomaly detection methods," Eastern Michigan University, (2016): 125 pages.
Mok, Wai Yin. "Utilizing nested normal form to design redundancy free JSON schemas." International Journal of Recent Contributions from Engineering, Science & IT (iJES) 4.4 (2016): 21-25.

* cited by examiner

*Primary Examiner* — Charles D Adams
(74) *Attorney, Agent, or Firm* — CANTOR COLBURN LLP; Robert D. Bean

(57)          ABSTRACT

Computer-implemented methods for optimizing the structure of JSON data are provided. Aspects include receiving first JavaScript Object Notation (JSON) data, where the first JSON data includes a plurality of data objects. Aspects also include generating, based on the first JSON data, second JSON data. The second JSON data includes one or more flattened data objects, where the one or more flattened data objects correspond to one or more first data objects of the first JSON data and are absent a hierarchical structure. The second JSON data includes one or more non-flattened data objects, where the one or more non-flattened data objects correspond to one or more second data objects of the first JSON data.

19 Claims, 7 Drawing Sheets

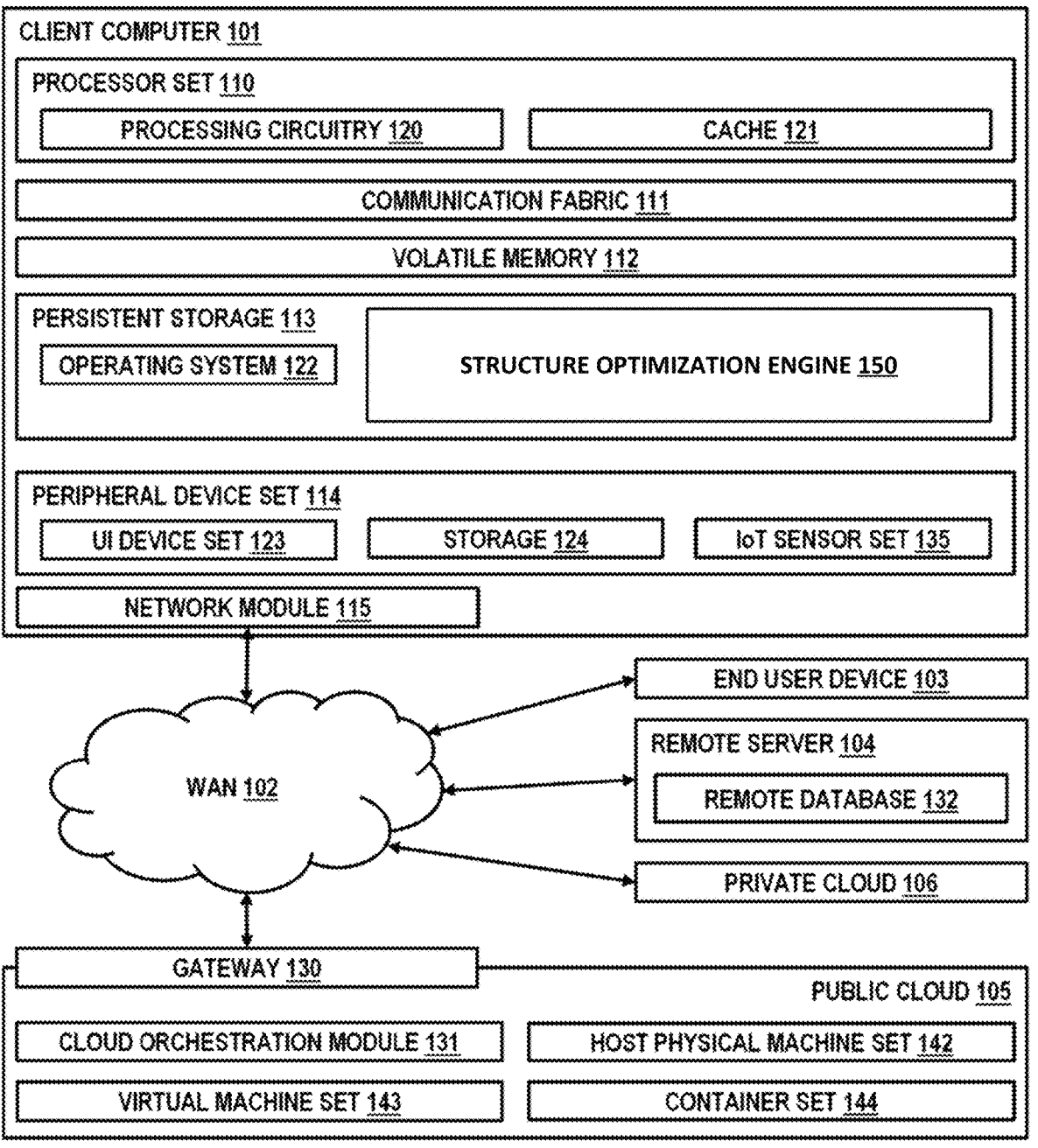

CLIENT COMPUTER 101

PROCESSOR SET 110

PROCESSING CIRCUITRY 120        CACHE 121

COMMUNICATION FABRIC 111

VOLATILE MEMORY 112

PERSISTENT STORAGE 113

OPERATING SYSTEM 122        STRUCTURE OPTIMIZATION ENGINE 150

PERIPHERAL DEVICE SET 114

UI DEVICE SET 123        STORAGE 124        IoT SENSOR SET 135

NETWORK MODULE 115

WAN 102

END USER DEVICE 103

REMOTE SERVER 104

REMOTE DATABASE 132

PRIVATE CLOUD 106

GATEWAY 130

PUBLIC CLOUD 105

CLOUD ORCHESTRATION MODULE 131        HOST PHYSICAL MACHINE SET 142

VIRTUAL MACHINE SET 143        CONTAINER SET 144

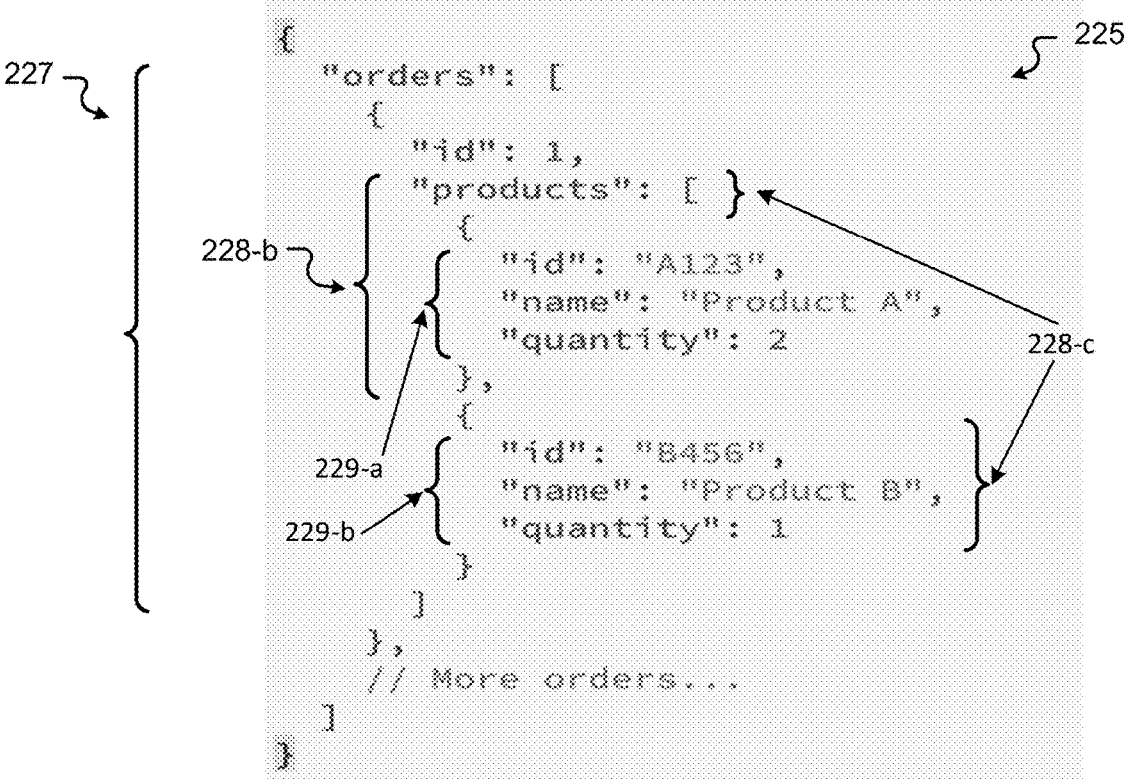
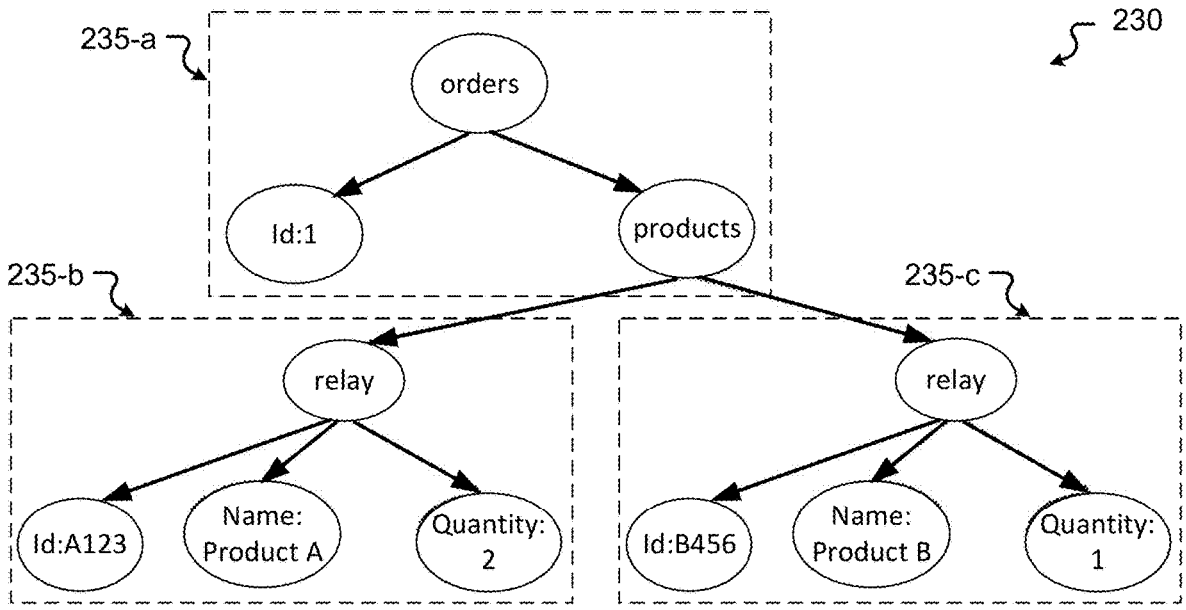
*FIG. 4*

662

610-a 610-b

600

700

OPTIMIZING JSON STRUCTURE

BACKGROUND

Aspects of the present disclosure relate to the field of data processing and, more particularly, to a processing method for optimizing the structure of JavaScript Object Notation (JSON) data.

JSON is an open-standard data format or interchange for semi-structured data. In some cases, some cloud and enterprise applications use the JSON data format. JSON is text-based and readable by humans and machines. JSON data may be written as name/value pairs. The structure of JSON data may become more complex when a value included in the data is an array and/or object. JSON data may have a hierarchical structure (e.g., nested arrays or objects).

SUMMARY

Embodiments of the present disclosure are directed to computer implemented methods for optimizing the structure of JSON data. According to an aspect, a computer implemented method includes receiving first JavaScript Object Notation (JSON) data, where the first JSON data includes a plurality of data objects. The computer-implemented method includes generating, based on the first JSON data, second JSON data. The second JSON data includes one or more flattened data objects, where the one or more flattened data objects correspond to one or more first data objects of the plurality of data objects of the first JSON data and are absent a hierarchical structure. The second JSON data includes one or more non-flattened data objects, where the one or more non-flattened data objects correspond to one or more second data objects of the plurality of data objects of the first JSON data. The operations provide advantages and technical improvements that support partial flattening of JSON data. For example, the operations support refraining from flattening some JSON objects in a dataset, which may advantageously prevent unnecessary increases redundancy in the JSON dataset. The operations support partial flattening of JSON data, providing a balance with respect to redundancy and performance.

Embodiments also include a computing system having a memory having program instructions and one or more processors for executing the program instructions. The program instructions control the one or more processors to perform operations that include receiving JSON data, where the first JSON data includes a plurality of data objects, and generating, based on the first JSON data, second JSON data. The second JSON data includes one or more flattened data objects, where the one or more flattened data objects correspond to one or more first data objects of the plurality of data objects of the first JSON data and are absent a hierarchical structure. The second JSON data includes one or more non-flattened data objects, where the one or more non-flattened data objects correspond to one or more second data objects of the plurality of data objects of the first JSON data. The operations provide advantages and technical improvements that support partial flattening of JSON data. For example, the operations support refraining from flattening some JSON objects in a dataset, which may advantageously prevent unnecessary increases redundancy in the JSON dataset. The operations support partial flattening of JSON data, providing a balance with respect to redundancy and performance.

Embodiments also include a computer program product having a program storage medium having program instructions embodied therewith. The program instructions executable by a processor to cause the processor to perform operations that include receiving JSON data, where the first JSON data includes a plurality of data objects, and generating, based on the first JSON data, second JSON data. The second JSON data includes one or more flattened data objects, where the one or more flattened data objects correspond to one or more first data objects of the plurality of data objects of the first JSON data and are absent a hierarchical structure. The second JSON data includes one or more non-flattened data objects, where the one or more non-flattened data objects correspond to one or more second data objects of the plurality of data objects of the first JSON data. The operations provide advantages and technical improvements that support partial flattening of JSON data. For example, the operations support refraining from flattening some JSON objects in a dataset, which may advantageously prevent unnecessary increases redundancy in the JSON dataset. The operations support partial flattening of JSON data, providing a balance with respect to redundancy and performance.

Other embodiments of the present invention implement features of the above-described method in computer systems and computer program products.

Additional technical features and benefits are realized through the techniques of the present disclosure. Embodiments and aspects of the disclosure are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the present disclosure are apparent from the following detailed description taken in conjunction with the accompanying drawings in which:

FIG. 1 illustrates a block diagram of an example computer system for use in conjunction with one or more embodiments of the present disclosure.

FIG. 4 illustrates examples of JSON data and a corresponding hierarchical data structure in accordance with one or more embodiments of the present disclosure.

DETAILED DESCRIPTION

Figure 2:
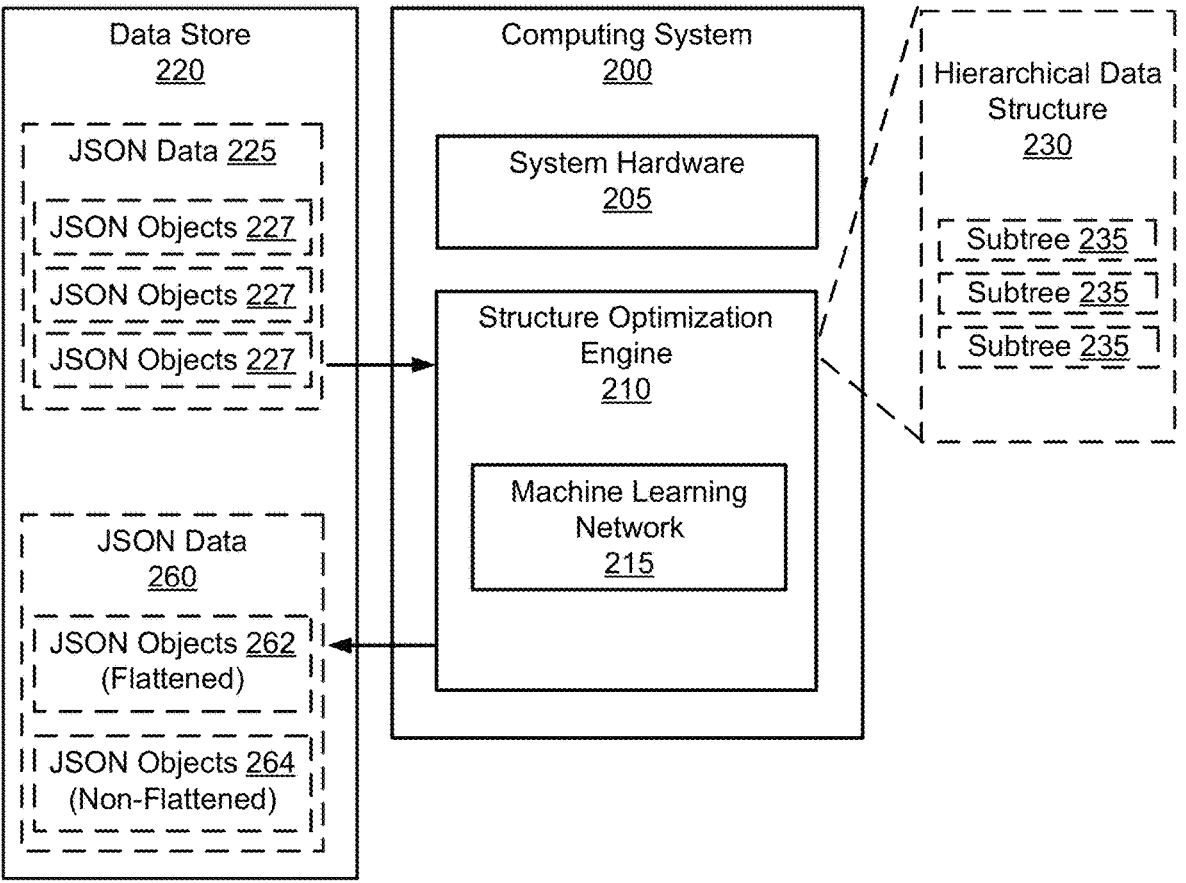
FIG. 2 illustrates a block diagram of an example computer system for use in accordance with one or more embodiments of the present disclosure.

A JSON dataset may be a deeply nested structure. Some approaches may optimize parse performance by flattening the structures. In some cases, flattening may simplify the structures of the JSON dataset and reduce instances of recursive parsing, which may improve performance. However, flattening the data may increase redundancy in the JSON dataset and increase user difficulty associated with directly maintaining, updating, or reading text-based data included in the JSON dataset. The terms "nested structure" and "hierarchical structure" may be used interchangeably herein.

Embodiments of the present disclosure are directed to computer implemented methods for optimizing the structure of JSON data. According to an aspect, a computer implemented method includes receiving first JavaScript Object Notation (JSON) data, where the first JSON data includes a plurality of data objects. The computer-implemented method includes generating, based on the first JSON data, second JSON data. The second JSON data includes one or more flattened data objects, where the one or more flattened data objects correspond to one or more first data objects of the plurality of data objects of the first JSON data and are absent a hierarchical structure. The second JSON data includes one or more non-flattened data objects, where the one or more non-flattened data objects correspond to one or more second data objects of the plurality of data objects of the first JSON data. The operations provide advantages and technical improvements that support partial flattening of JSON data. For example, the operations support refraining from flattening some JSON objects in a dataset, which may advantageously prevent unnecessary increases redundancy in the JSON dataset. The operations support partial flattening of JSON data, providing a balance with respect to redundancy and performance.

Embodiments also include a computing system having a memory having program instructions and one or more processors for executing the program instructions. The program instructions control the one or more processors to perform operations that include receiving JSON data, where the first JSON data includes a plurality of data objects, and generating, based on the first JSON data, second JSON data. The second JSON data includes one or more flattened data objects, where the one or more flattened data objects correspond to one or more first data objects of the plurality of data objects of the first JSON data and are absent a hierarchical structure. The second JSON data includes one or more non-flattened data objects, where the one or more non-flattened data objects correspond to one or more second data objects of the plurality of data objects of the first JSON data. The operations provide advantages and technical improvements that support partial flattening of JSON data. For example, the operations support refraining from flattening some JSON objects in a dataset, which may advantageously prevent unnecessary increases redundancy in the JSON dataset. The operations support partial flattening of JSON data, providing a balance with respect to redundancy and performance.

Embodiments also include a computer program product having a program storage medium having program instructions embodied therewith. The program instructions executable by a processor to cause the processor to perform operations that include receiving JSON data, where the first JSON data includes a plurality of data objects, and generating, based on the first JSON data, second JSON data. The second JSON data includes one or more flattened data objects, where the one or more flattened data objects correspond to one or more first data objects of the plurality of data objects of the first JSON data and are absent a hierarchical structure. The second JSON data includes one or more non-flattened data objects, where the one or more non-flattened data objects correspond to one or more second data objects of the plurality of data objects of the first JSON data. The operations provide advantages and technical improvements that support partial flattening of JSON data. For example, the operations support refraining from flattening some JSON objects in a dataset, which may advantageously prevent unnecessary increases redundancy in the JSON dataset. The operations support partial flattening of JSON data, providing a balance with respect to redundancy and performance.

In addition to or alternative to one or more of the features described herein, the methods and operations include generating a hierarchical data structure based on the first JSON data. In addition to or alternative to one or more of the features described herein, the methods and operations include identifying one or more target portions of the hierarchical data structure based on comparing one or more portions of the hierarchical data structure to a threshold depth level, where the one or more target portions of the hierarchical data structure correspond to the one or more first data objects. In addition to or alternative to one or more of the features described herein, the methods and operations include generating the one or more flattened data objects by flattening the one or more first data objects.

In addition to or alternative to one or more of the features described herein, the methods and operations include clustering a plurality of target portions included among the one or more target portions, based on a similarity among the plurality of target portions, selecting a target portion of the hierarchical data structure from among the plurality of target portions, based on one or more criteria, and flattening a target data object or refraining from flattening the target data object, based on one or more second criteria, where the target data object corresponds to the target portion of the hierarchical data structure. The operations provide advantages and technical improvements that support partial flattening of JSON data by flattening data objects based on similarity.

In addition to or alternative to one or more of the features described herein, the methods and operations include determining the similarity among the plurality of target portions based on comparing respective vectors of the plurality of target portions. The operations provide advantages and technical improvements that support partial flattening of JSON data by flattening data objects based on similarity, in which the methods and operations utilize a distance metric based on sub-tree to find redundant parts and common parts (e.g., among the sub-trees), and respectively performing different actions (e.g., flattening) on redundant parts compared to common parts.

In addition to or alternative to one or more of the features described herein, selecting the target portion is based on an abnormality associated with the target portion. The operations provide advantages and technical improvements that support partial flattening of JSON data by flattening data objects based on a lack of similarity (e.g., abnormality).

In addition to or alternative to one or more of the features described herein, the one or more second criteria includes a threshold amount of user behavior associated with accessing one or more parts of the target data object, modifying the one or more parts of the target data object, or both. The operations provide advantages and technical improvements that support partial flattening of JSON data based on user history and purpose, and further, storing and parsing the flattened data with high performance.

In addition to or alternative to one or more of the features described herein, generating the hierarchical data structure includes generating respective hierarchical data structures corresponding to the plurality of data objects, one by one, in response to one or more criteria, wherein the one or more criteria includes a threshold temporal period. The operations provide advantages and technical improvements that support partial flattening of JSON data by selective focusing on data objects.

In addition to or alternative to one or more of the features described herein, generating the one or more flattened data objects includes generating least a first flattened data object and a second flattened data object according to a format common to the first flattened data object and the second flattened data object. The operations provide advantages and technical improvements that support labeling and identification of flattened parts.

In addition to or alternative to one or more of the features described herein, the methods and operations include providing the first JSON data to one or more machine learning models, wherein generating the second JSON data is based on processing the first JSON data using the one or more machine learning models. The machine learning methods and operations incorporated in the flattening techniques described herein provide increased accuracy, capability, and efficiency in association with analyzing JSON data compared to some other techniques. The machine learning operations and methods provide increased accuracy, capability, and efficiency in association with identifying portions of JSON data to be flattened compared to some other techniques (e.g., SQL based search techniques).

In addition to or alternative to one or more of the features described herein, the methods and operations include storing the second JSON data to a JSON data store; and deleting the first JSON data from the JSON data store. The operations provide advantages and technical improvements that support.

Advantageously, partially flattened JSON data may reduce unnecessary redundancy in the JSON dataset and mitigate increases in user difficulty associated with directly maintaining, updating, or reading text-based data included in the JSON dataset.

Various aspects of the present disclosure are described by narrative text, flowcharts, block diagrams of computer systems, and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as optimizing a JSON structure by structure optimization engine 150. In addition to structure optimization engine 150, computing environment 100 includes, for example, computer 101, wide area network (WAN) 102, end user device (EUD) 103, remote server 104, public Cloud 105, and private Cloud 106. In this embodiment, computer 101 includes processor set 110 (including processing circuitry 120 and cache 121), communication fabric 111, volatile memory 112, persistent storage 113 (including operating system 122 and structure optimization engine 150, as identified above), peripheral device set 114 (including user interface (UI), device set 123, storage 124, and Internet of Things (IoT) sensor set 135), and network module 115. Remote server 104 includes remote database 132. Public Cloud 105 includes gateway 130, Cloud orchestration module 131, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 132. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a Cloud, even though it is not shown in a Cloud in FIG. 1. On the other hand, computer 101 is not required to be in a Cloud except to any extent as may be affirmatively indicated. In an example, the computing environment 100 may include a local database or remote database 132 supportive of storing, processing, and managing data in JSON format. The local data base or the remote database 132 may be, for example, a JSON data store 220 later illustrated herein.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in structure optimization engine 150 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in structure optimization engine 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 135 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collects and store helpful and useful data for use by other computers, such as computer 101. For example, in a hypothetical case where computer 101 is designed and programmed to provide a recommendation based on historical data, then this historical data may be provided to computer 101 from remote database 132 of remote server 104.

PUBLIC CLOUD 105 is any computer system available for use by multiple entities that provides on-demand availability of computer system resources and/or other computer capabilities, especially data storage (Cloud storage) and computing power, without direct active management by the user. Cloud computing typically leverages sharing of resources to achieve coherence and economies of scale. The direct and active management of the computing resources of public Cloud 105 is performed by the computer hardware and/or software of Cloud orchestration module 131. The computing resources provided by public Cloud 105 are typically implemented by virtual computing environments that run on various computers making up the computers of host physical machine set 142, which is the universe of physical computers in and/or available to public Cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 131 manages the transfer and storage of images, deploys new instantiations of VCEs and manages active instantiations of VCE deployments. Gateway 130 is the collection of computer software, hardware, and firmware that allows public Cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public Cloud 105, except that the computing resources are only available for use by a single enterprise. While private Cloud 106 is depicted as being in communication with WAN 102, in other embodiments a private Cloud may be disconnected from the internet entirely and only accessible through a local/private network. A hybrid Cloud is a composition of multiple Clouds of different types (for example, private, community or public Cloud types), often respectively implemented by different vendors. Each of the multiple Clouds remains a separate and discrete entity, but the larger hybrid Cloud architecture is bound together by standardized or proprietary technology that enables orchestration, management, and/or data/application portability between the multiple constituent Clouds. In this embodiment, public Cloud 105 and private Cloud 106 are both part of a larger hybrid Cloud.

One or more embodiments described herein can utilize machine learning techniques to perform prediction and or classification tasks, for example. In one or more embodiments, machine learning functionality can be implemented using an artificial neural network (ANN) having the capability to be trained to perform a function. In machine learning and cognitive science, ANNs are a family of statistical learning models inspired by the biological neural networks of animals, and in particular the brain. ANNs can be used to estimate or approximate systems and functions that depend on a large number of inputs. Convolutional neural networks (CNN) are a class of deep, feed-forward ANNs that are particularly useful at tasks such as, but not limited to analyzing visual imagery and natural language processing (NLP). Recurrent neural networks (RNN) are another class of deep, feed-forward ANNs and are particularly useful at tasks such as, but not limited to, unsegmented connected handwriting recognition and speech recognition. Other types of neural networks are also known and can be used in accordance with one or more embodiments described herein.

ANNs can be embodied as so-called "neuromorphic" systems of interconnected processor elements that act as simulated "neurons" and exchange "messages" between each other in the form of electronic signals. Similar to the so-called "plasticity" of synaptic neurotransmitter connections that carry messages between biological neurons, the connections in ANNs that carry electronic messages between simulated neurons are provided with numeric weights that correspond to the strength or weakness of a given connection. The weights can be adjusted and tuned based on experience, making ANNs adaptive to inputs and capable of learning. For example, an ANN for handwriting recognition is defined by a set of input neurons that can be activated by the pixels of an input image. After being weighted and transformed by a function determined by the network's designer, the activation of these input neurons are then passed to other downstream neurons, which are often referred to as "hidden" neurons. This process is repeated until an output neuron is activated. The activated output neuron determines which character was input.

A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

FIG. 2 depicts a block diagram of an example computing system 200 that supports optimizing the structure of JSON data 225 in accordance with one or more embodiments of the present disclosure. JSON data 225 may be, for example, a JSON dataset. In an example, the JSON data 225 may be stored in and accessible via a JSON data store 220. The JSON data 225 may include JSON objects 227, example aspects of which are later described herein.

All or a portion of the system 200 shown in FIG. 2 can be implemented, for example, by all or a subset of the computing environment 100 of FIG. 1. In one or more embodiments, the computing system 200 is embodied in a computer 101 as the one shown in FIG. 1. In one or more embodiments, the computing system 200 is embodied in an end user device 103 as the one shown in FIG. 1.

The computing system 200 includes system hardware 205. The system hardware 205 includes the central processing units (CPUs), graphical processing units (GPUs), memory, and the like that are part of the computing system. The system hardware 205 executes computer code stored at a memory (e.g., volatile memory 112, persistent storage 113, storage 124, and the like described with reference to FIG. 1) of the computing system 200.

The computing system 200 includes a structure optimization engine 210. The 210 may be implemented by aspects of structure optimization engine 150 described herein. The structure optimization engine 210 may support optimizing a JSON structure in accordance with example aspects of the present disclosure. The structure optimization engine 210 may be, for example, a JSON handler engine capable of producing a hierarchical data structure 230 from JSON data 225. In an example, subtrees 235 (also referred to herein as portions or sub-portions) of the hierarchical data structure 230 may respectively correspond to JSON objects 227 included in the JSON data 225. The JSON data 225 may have a hierarchical structure. For example, data elements in the JSON data 225 (e.g., data elements in the JSON object 227) may themselves be hierarchical.

As will be described herein, the structure optimization engine 210 may be, for example, a JSON handler engine capable of producing JSON data 260 based on analyzing the hierarchical data structure 230.

The JSON data 260 may include JSON objects 261 generated by the structure optimization engine 210 based on flattening of one or more JSON objects 227 in accordance with one or more embodiments of the present disclosure. For example, a given JSON object 262 may be a flattened counterpart of a given JSON object 227. Additionally, or alternatively, a given JSON object 262 may be a flattened counterpart of multiple JSON objects 227. Each JSON object 261 may also be referred to herein as a common JSON object with simple structure or as a common object simplified.

The JSON data 260 may include JSON objects 264 which are non-flattened counterparts of one or more JSON objects 227 in accordance with one or more embodiments of the present disclosure.

Accordingly, for example, the structure optimization engine 210 is capable of modifying or flattening structures (e.g., one or more JSON objects 227) of the JSON data 225, and thereby generating the JSON data 260 by modifying or partially flattening the JSON data 225. Example aspects of the partial flattening of the JSON data 225 are later described herein.

The computing system 200 includes a machine learning network 215. The machine learning network 215 may be included in or separate from the structure optimization engine 210. The computing system 200 may utilize data stored in a corresponding memory (e.g., memory of a computer 101, memory of a EUD 103, memory at a remote server 104, and the like) as machine learning network 215. Machine learning network 215 may include a machine learning architecture. In some aspects, the machine learning network 215 may be or include one or more classifiers. In some other aspects, the machine learning network 215 may be or include any suitable machine learning network such as, for example, a deep learning network, a convolutional neural network, or the like. Some functions of the computing system 200 may be implemented using machine learning techniques.

The machine learning network 215 may include a machine learning model(s) which may be trained and/or updated based on data (e.g., training data) provided or accessed by the computing system 200. The machine learning model(s) may be built and updated by the computing system 200 based on the training data (also referred to herein as training data and feedback). In some aspects, the machine learning model(s) may be built and updated by the computing system 200 based on data generated by and/or operations performed by the 200.

In an example, data provided to the machine learning network 215 may be provided by JSON objects 227. For example, the techniques described herein include forming a cluster model configured to find special parts (e.g., a "special" subtree 235 and a corresponding JSON object 227 described herein) by cluster outlier. In some aspects, in contrast to other approaches which form a cluster model by calculation on vector distance, the techniques described herein include skipping the vector itself.

The techniques described herein may include considering a relationship between subtrees (e.g., between two subtrees 235) to form the vector distance directly. For example, the relationship may include a correlation or 0.1 distribution (e.g., Func (a, b) later described herein with reference to Equations (1) and (2)). In some embodiments, the techniques described herein may include calculating the correlation value (e.g., any value from 0 to 1) using a Pearson correlation that measures linear correlation between two sets of data. In an example, the input to the machine learning network 215 is S (V1,V2) (as later described herein with reference to Equation (1)), and in response to processing the input, the machine learning network 215 may output a cluster model.

Expressed another way, the techniques described herein may include updating all distance in a traditional cluster model by S (V1,V2) described herein. in accordance with one or more embodiments of the present disclosure, the techniques described herein include constructing a cluster model and using the cluster model to find special parts (e.g., a "special" subtree 235 and a corresponding JSON object 227 described herein) by cluster outlier. In some aspects, the techniques described herein may refrain from using the cluster model for prediction.

Non-limiting examples of clustering algorithms supported by the cluster model in accordance with one or more embodiments of the present disclosure include centroid-based clustering (e.g., k-means, K-Nearest Neighbors (KNN), or the like), density-based clustering, distribution-based clustering, and hierarchical clustering. Aspects of the present disclosure support supervised and unsupervised training, updating, and use of the machine learning network 215.

The computing system 200 may be integrated with or be electrically coupled to a user interface implemented by, for example, device set 123 of FIG. 1. The computing system 200 may provide (e.g., visually, audibly, and the like) data via the user interface.

Features performed by the computing system 200 in accordance with example aspects of the present disclosure will be further described with reference to the following figures.

Figure 3:
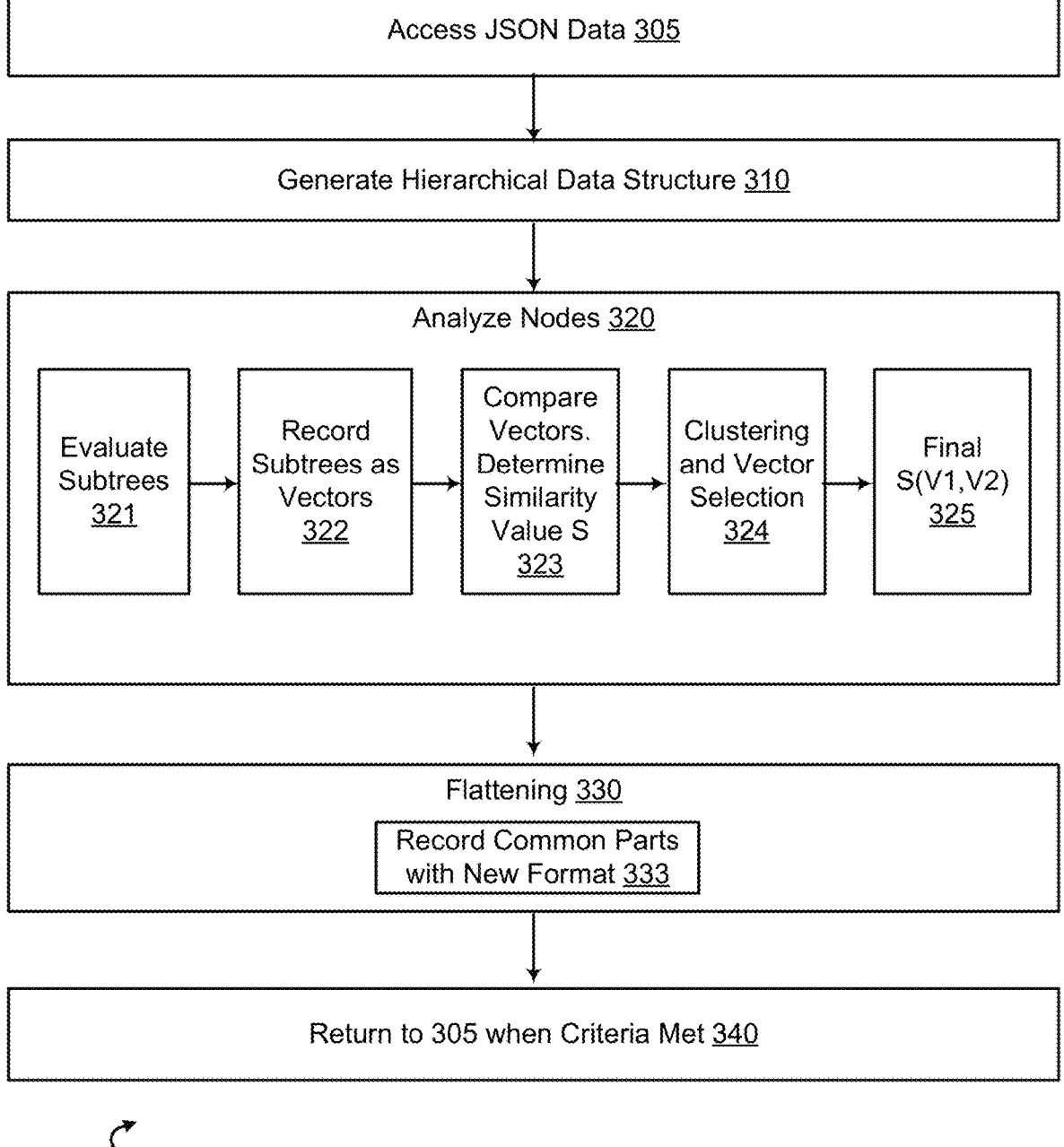
FIG. 3 illustrates an example flowchart of a method in accordance with one or more embodiments of the present disclosure.

FIG. 3 illustrates an example flowchart of a method 300 in accordance with one or more embodiments of the present disclosure. Aspects of the method 300 may be implemented by computing system 200 described herein. For example, aspects of the method 300 may be implemented by structure optimization engine 210 in combination with machine learning network 215. Example aspects of the method 300 are described with reference to FIGS. 2 through 6.

At 305, the method 300 includes accessing JSON data 225. The JSON data 225 may be included in JSON data store 220.

At 310, the method 300 includes generating a hierarchical data structure 230 based on the JSON data 225. The hierarchical data structure 230 may be referred to a tree, a tree structure, a tree-like structure, a hierarchical tree structure having a set of connected nodes, a hierarchical node structure, and the like. The hierarchical data structure 230 may include root nodes and leaf nodes, in which each node represents a part of the JSON data 225.

Expressed another way, at 310, the method 300 includes building a tree-like structure based on the JSON data 225, in which the JSON data 225 includes one or more complicated objects (e.g., one or more JSON objects 227 which the structure optimization engine 210 identifies for flattening in accordance with one or more embodiments of the present disclosure). That is, the method 300 includes transforming the JSON data 225 into a tree-like structure.

In an example, each JSON object 227 may include two structures. In an example, one of the structures is an object, and the other of the structures is an array, and they can exist iteratively. For example, JSON data may represent data as a collection of key-value pairs, where the keys are strings and the values can be strings, numbers, objects (e.g., another JSON object), arrays, Boolean values, or null.

In an example, each JSON object 227 may be a key-value pair. A key-value pair is an array with two elements: the first element is the property key (a string), and the second element is the property value.

At 310, for each JSON object 227, the method 300 may include making the key a root node and making each value (object)/values (array) a leaf node(s). In some embodiments, if an array is an entry point, the method 300 may include construing the array as a relay node and continuing to build the entire hierarchical data structure 230 based on the array (e.g., by making the key a root node and making each value (object)/values (array) a leaf node(s)). An example of a relay node is later illustrated at FIG. 4.

In some embodiments, for each value that is a simple value (e.g., a string or a number), the method 300 may include recording the value directly as a node of the hierarchical data structure 230. Additionally, or alternatively, for each value that not a simple value, the method 300 may include growing the hierarchical data structure 230 (i.e., grow the tree). In an example, for a case in which a products value is one array, the method 300 may include constructing a corresponding relay node for the hierarchical data structure 230.

An example of the JSON data 225 and hierarchical data structure 230 described with reference to FIG. 3 are illustrated at FIG. 4. For example, FIG. 4 illustrates non-limiting examples of JSON data 225 (including a JSON object 227) and a corresponding hierarchical data structure 230.

At 320, the method 300 includes analyzing nodes of the hierarchical data structure 230. For example, the method 300 includes considering nodes of the hierarchical data structure 230 (e.g., nodes of hierarchical data structure 230 illustrated at FIG. 4) by machine learning to identify specific subtrees 235 of the hierarchical data structure 230. The identified subtrees 235 described herein may also referred to herein as target subtrees 235 of the hierarchical data structure 230 or target portions of the hierarchical data structure 230. For example, aspects of the method 300 described with reference to 320 may be implemented by machine learning network 215 of FIG. 2.

For example, at 321, the method 300 includes evaluating subtrees 235 of the hierarchical data structure 230 generated at 310. In an example, the method 300 includes may include determining respective depth levels of subtrees 235 of the hierarchical data structure 230.

In some aspects, at 321, the method 300 may include defining a threshold depth level (also referred to herein as a maximum subtree depth). In some aspects, the threshold depth level may be relatively small. For example, the threshold depth level may have a default depth level of two. However, aspects of the present disclosure are not limited thereto, and the threshold depth level may be any suitable depth level supportive of the techniques described herein. In some aspects, setting the depth level to a higher value may increase the difficulty associated with finding subtrees according to the depth level, and setting the depth level to a lower value may reduce the difficulty associated with finding subtrees according to the depth level.

In an example, at 321, the method 300 includes extracting one or more valid subtrees 235 (e.g., one or more subtrees 235) from the hierarchical data structure 230 generated at 310, based on one or more criteria. For example, the method 300 includes searching the entire hierarchical data structure 230 (e.g., tree) and identifying subtrees 235 which satisfy the one or more criteria. In an example, the one or more criteria includes the threshold depth level, and the method 300 includes extracting valid subtrees 235 of the hierarchical data structure 230 based on comparing the depth levels of the subtrees 235 of the hierarchical data structure 230 to the threshold depth level. Additionally, or alternatively, the method 300 may include identifying and extracting valid subtrees 235 based on comparing the respective quantities of leaf nodes of the subtrees 235 to a threshold quantity.

In an example described with reference to FIG. 4, at 321, the method 300 may include evaluating subtrees 235 based on the threshold depth level (e.g., depth level of two). In an example, at 321, the method 300 includes identifying and extracting, as valid subtrees 235, subtree 235-*a* through subtree 235-*c*. For example, subtree 235-*a* through subtree 235-*c* are each of a depth level of two. In the example, subtree 235-*b* and subtree 235-*c* each have three leaf nodes. In an example, at 321, the method 300 includes identifying, as an invalid subtree, a subtree "orders-products-relay" of a depth level of three.

At 322, the method 300 includes recording all subtrees 235 which satisfy the one or more criteria (e.g., threshold depth level of two) as vectors. That is, for example, the method 300 includes recording subtrees 235 as identified and extracted with reference to 321.

In the example described with reference to FIG. 4, each of subtree 235-*b* and subtree 235-*c* includes 3 leaf nodes. At 322, the method 300 includes recording a 3-dimension link vector [relay→Id, relay→Name, relay→Quantity] for each of subtree 235-*b* and subtree 235-*c*.

At 323, the method 300 includes, for each subtree 235, comparing vectors to each other and acquiring a similarity result S. For example, the method 300 includes comparing the vectors recorded at 322. Based on the comparison, the method 300 includes determining a similarity value S between subtrees 235 respectively corresponding to the vectors. In some examples, the similarity value S may be based on a vector distance, example aspects of which are described herein.

In an example, a sub tree 235 (e.g., subtree 235-*b*) has M dimensions V1, and another subtree 235 (e.g., subtree 235-*c*) has N dimensions V2. The method 300 may include calculating a similarity value S (according to Equation (1) herein) and a function "Func" (according to Equation (2) herein).

$$S(V1, V2) = \sum_{i=0}^{M}\sum_{j=0}^{N} Func(V1_i, V2_j) \tag{1}$$

$$Func(a, b)\begin{cases} = 1(\text{if } a \text{ is same as } b) \\ = 0(\text{otherwise}) \end{cases} \tag{2}$$

In some aspects, Func ( ) is a function which defines the relationship between two links. Func ( ) may have a default value of 1, but is not limited thereto. In some embodiments, aspects of the present disclosure support defining Func ( ) by use, for example, based on a known parameter (e.g., correlation between two keys). Accordingly, for example, aspects of the present disclosure support defining other values for Func ( ) based on one or more known parameters.

For the purposes of the present discussion, the JSON data 225 (and a corresponding hierarchical data structure 230 and subtrees 235) may be multi-dimensional data that can be partitioned by interrelated groupings or categories. The term "dimension," also referred to herein as a data dimension, may be any category (e.g., "orders," "id," "products," "name," "quantity," or the like) which the structure optimization engine 210 may use to group or categorize data.

A data level may be any categorization of data of a given dimension. For example, data that includes a "user" dimension may include different data levels associated with id, name, address, and the like. In another example, data that includes an "orders" dimension may include different data levels associated with id, products, and the like. In another example, data that includes a "products" dimension may include different data levels associated with id, name, quantity, and the like. The data levels may represent an extrinsic sub-hierarchy of an intrinsic hierarchy that includes the given dimension. In general, extrinsic hierarchies include various data levels, while intrinsic hierarchies may include several dimensions that may include different data levels.

At 324, the method 300 includes clustering data points associated with the hierarchical data structure 230 (and the included subtrees 235). For example, the similarity value S described herein may represent the similarity between multiple subtrees 235 (e.g., two or more subtrees 235). In an example, a larger similarity value S may indicate a higher similarity between the subtrees 235.

In an example, at 324, the method 300 includes clustering the subtrees 235 described with reference to 321 through 323 (e.g., subtrees 235 meeting the threshold depth level and for which a vector is recorded). For example, for a set of data points corresponding to the subtrees 235 described with reference to 321 through 323, the method 300 includes applying a clustering algorithm to classify each data point into a specific group. In an example, points that are in the same group may have similar properties and/or features, and data points in different respective groups may have highly dissimilar properties and/or features.

For example, at 324, the method 300 may include clustering the subtrees 235 described with reference to 321 through 323 (e.g., subtrees 235 meeting the threshold depth level and for which a vector is recorded) based on similarity values S.

In an example, at 324, the method 300 may include vector selection. For example, the method 300 may include selecting an abnormal vector from among the clusters and the recorded vectors based on a defined threshold (e.g., defined by a user). In an embodiment, the defined threshold may be a threshold vector distance associated with the similarity or dissimilarity between data points. For example, the threshold vector distance may be between a data point and another data point (and additionally, or alternatively, between the data point and a cluster of data points). Non-limiting examples of the threshold vector distance include Euclidean distance, Manhattan distance, Cosine similarity, Jaccard similarity, Hamming distance, Mahalanobis distance, and the like.

In an example, the abnormal vector may represent a "special" subtree 235 included among the subtrees 235 of the hierarchical data structure 230. For example, the "special" subtree 235 may be a portion of the entire hierarchical data structure 230. For example, the "special" subtree may be included in the subtrees 235 described with reference to 321 through 323 (e.g., subtrees 235 meeting the threshold depth level and for which a vector has been recorded).

At 325, the method 300 includes determining a final similarity value S among dimensions. For example, the method 300 may include fixing a final S (V1, V2) based on instances of high frequency fluctuation of user behaviour (e.g., user queries and/or user changes associated with JSON data corresponding to a given subtree 235).

In the example described with reference to FIG. 3 and FIG. 4, JSON code 228-*b* may correspond to subtree 235-*b*, and JSON code 228-*c* may correspond to subtree 235-*c*. At 323, the method 300 may determine a similarity value S between subtree 235-*b* and subtree 235-*c* as described herein.

In a first example case, at 325, in response to determining that the amount (or in some cases, a frequency) of user behavior associated with JSON code 228-*b* corresponding to subtree 235-*b* is less than a threshold value, the method 300 may include maintaining or increasing the similarity value S between subtree 235-*b* and subtree 235-*c*. For example, at 325, in response to determining that a quantity of user queries and/or user changes to the JSON code 228-*b* (e.g., changes to "id," "name," or "quantity") with respect to a temporal period is less than a threshold quantity, the method 300 may include maintaining or increasing the similarity value S between subtree 235-*b* and subtree 235-*c*.

Accordingly, for example, the method 300 may include marking the JSON object 227 (including JSON code 228-*b* and the JSON code 228-*c*) as "special," and the method 300 may proceed to 330 (e.g., flattening), example aspects of which are later described herein. Expressed another way, at 325, if a user queries more, the method 300 may fix the similarity value S to a smaller value because we will avoid to flatten to increase the redundancy.

In another example, V1,V2 are two different sub-trees. In one fixed period, a user queries V1 a total quantity of N1 times and queries V2 a total quantity of N2 times. Using N1*N2 as the indicator of frequency, the method 300 may include normalizing all N1*N2 values from different similarity value S to one range (e.g., [0.5,1.5], but not limited thereto)) and using a normalized value (e.g., one normalized value for one similarity value S) to fix the distance by multiplication.

In a second example case, at 325, in response to determining that the amount (or in some cases, frequency) of user behavior associated with JSON code 228-*b* corresponding to subtree 235-*b* is greater than or equal to the threshold value, the method 300 may include reducing the similarity value S between subtree 235-*b* and subtree 235-*c*. For example, at 325, in response to determining that the quantity of user queries and/or user changes to the JSON code 228-*b* (e.g., changes to "id," "name," or "quantity") with respect to the temporal period is greater than or equal to the threshold quantity, the method 300 may include reducing the similarity value S between subtree 235-*b* and subtree 235-*c*.

Accordingly, for example, the method 300 may include refraining from marking the JSON code 228-*b* and/or the JSON code 228-*c* as "special." At the flattening implemented at 330, the method 300 may include refraining from flattening parts not identified as "special."

At the flattening implemented at 330, the method 300 may include flattening parts identified as "special" (e.g., parts identified as "special" by the machine learning techniques described herein). At 333, the method 300 may include recording similar parts (also referred to herein as "common parts") with a new format, an example of which is later described herein.

Figure 5:
FIG. 5 illustrates an example of partial flattening of JSON data in accordance with one or more embodiments of the present disclosure.

Example aspects of the flattening at 330 are described herein with reference to FIG. 4 and FIG. 5. FIG. 5 illustrates an example of partial flattening of JSON data 525. JSON data 525 is an example of JSON data 225 described herein. JSON objects 527 (e.g., JSON object 527-*a* through JSON object 527-*c*) included in the JSON data 525 are examples of JSON objects 227 described herein.

For example, FIG. 5 illustrates flattening of JSON object 527-*a* according to a first example case as described with reference to FIG. 4, in which the JSON object 527-*a* has been marked (in accordance with techniques described with reference to 325) as "special." FIG. 5 illustrates an example of flattening JSON object 527-*a* and JSON object 527-*b* identified as "special," and further, refraining from flattening JSON object 527-*c* identified as not "special."

At 330, the method 300 may include identifying or searching for "special" parts in a top down manner. For example, the method 300 may include identifying or selecting a branch as "special" based on identifying that subtrees of the branch are all special. Expressed another way, for example, at 330, the method 300 may include selecting a special part from top to end if one branch is all special which means combined with special subtree layer by layer. Expressed another way, if a subtree vector in a cluster is an outlier, the method 300 may include identifying the subtree vector as a "special" part. In some aspects, when considering an entire tree (e.g., an entire hierarchical data structure 230 including multiple subtrees 235), if from any node, a subtree 235 under the node is identified as a "special" part, the method 300 may include also identifying or selecting the branch including the node and the subtree 235 as special parts from top to end (e.g., not the root node but any node fulfilling this standard).

For example, aspects of the present disclosure support searching the JSON data 525 (e.g., JSON object 527-*a*, JSON object 527-*b*, and JSON object 527-*c*, and the like) to identify "special" parts to be flattened.

In the example, with reference to FIG. 2, the method 300 may output JSON data 260 (or JSON data 560) including flattened data (e.g., JSON objects 262) and non-flattened data (e.g., JSON objects 264). With reference to FIG. 5, the method 300 may output JSON data 560 including flattened data (e.g., JSON object 562-*a*, JSON object 562-*b*) and non-flattened data (e.g., JSON object 564).

Figure 6:
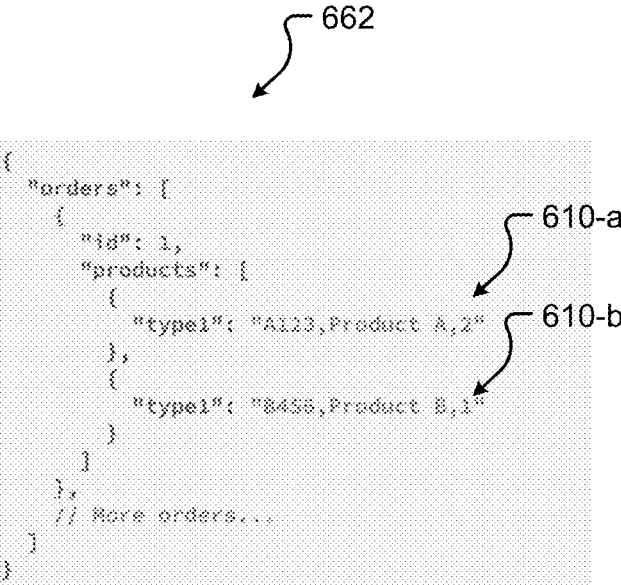
FIG. 6 illustrates an example result of recording similar parts according to a same format in accordance with one or more embodiments of the present disclosure.

Example aspects of recording similar parts (also referred to herein as "common parts") with a new format at 333 are described herein with reference to FIG. 2 and FIG. 6.

At 333, the method 300 may include recording as a same format for a similarity part. An example is described with reference to FIG. 4 and FIG. 6, in which similar parts are recorded according to a same format.

With reference to FIGS. 3, 4, and 6, an example of recording similar parts 229 (e.g., part 229-*a* and part 229-*b* included in JSON data 225 of FIG. 4) according to a same format is described in accordance with one or more embodiments of the present disclosure. For example, at 333, the method 300 may include generating JSON object 662 (also referred to herein as a common JSON object with simple structure), in which similar parts 229 included in JSON data 225 of FIG. 4 are recorded according to the same format.

In an example of recording the similar parts 229 according to the same format, the method 300 may generate data 610-*a* corresponding to part 229-*a* and generate data 610-*b* corresponding to part 229-*b*. As illustrated at FIG. 6, data 610-*a* and data 610-*b* are of the same format. JSON object 662 is an example of given JSON object 262 described with reference to FIG. 2.

At 340, the method 300 may include running the same process to acquire a new JSON object, after a threshold temporal period. For example, the method 300 may include modification of special parts based on user behavior, with respect to steps per cycle. For example, all statics of frequency used to fix S may be in one fixed period (cycle). The fixed period may be, for example, one day, one week, one month, or the like. In an example, the quantity of user queries and/or user changes to the JSON code 228-*b* (and part 229-*a* regarding "Product A") may be high for a first month but may change such that the quantity of user queries and/or user changes to the JSON code 228-*b* (and part 229-*b* regarding "Product B") is high for the following month. For example, each month has different products to sell. Accordingly, for example, the method 300 may include changing the special part by month. As described herein, the flattening of JSON objects is a transformation which includes flattening nested JSON objects into a flat format, which supports loading into databases and data warehouses. The techniques described herein of partial flattening of nested JSON may refer to the process of transforming portions of a nested JSON data structure into a flat data structure, in which some of the nested objects and arrays are transformed into a single level of key-value pairs. Transforming portions of a nested JSON data structure into a flat data structure as described herein may include transforming one or more nested objects and arrays into a single level of key-value pairs.

The techniques described herein support generating, based on some JSON objects in a dataset, corresponding flat data structures which are easier to process and analyze, as there are no nested objects to traverse. Flattening, for example, may in some cases provide a more understandable view in which key-value pairs are present without any nesting. Flattening may support context-specific security and constraints to be implemented in a readable but in a more verbose manner. As described herein, in contrast to some other approaches, the systems and techniques described herein support partial flattening. For example, for some JSON objects in a dataset, refraining from flattening the JSON objects may advantageously prevent unnecessary increases redundancy in the JSON dataset.

Accordingly, for example, as described herein, the computing system 200 supports an intelligent method to optimize JSON structure. The computing system 200 supports machine learning approaches for choosing (e.g., from JSON data 225) a suitable part to flatten. The computing system 200 supports flattening one or more parts (e.g., special parts referred to herein) to balance redundancy and performance. Aspects of the present disclosure described herein define how to identify special parts based on similarity and high frequency fluctuation by machine learning.

In accordance with one or more embodiments of the present disclosure, aspects of computing system 200 as described herein may overcome drawbacks associated with other techniques for optimization of JSON data.

For example, the computing system 200 is capable of optimizing data of a JSON format without information loss by using machine learning. The computing system 200 is capable of flattening the special parts of JSON data 225 by user history and purpose, and further, storing and parsing the flattened data with high performance.

The computing system 200 supports the use of machine learning methods for optimizing existing JSON data (e.g., JSON data 225) by user history, and further, searching the anomalies as special parts for storage and parsing purposes. The computing system 200 supports techniques for selective flattening (e.g., flattening special parts identified by machine learning) of portions of JSON data.

The computing system 200 supports using machine learning methods to define a distance metric between two tree-like structures (e.g., between subtrees of a hierarchical data structure 230). The computing system 200 may utilize the distance metric based on sub-tree to find redundant parts and common parts (e.g., among the sub-trees), and the computing system 200 may respectively perform different actions on redundant parts compared to common parts. The techniques described herein supported by the computing system 200 support effective optimization of complicated JSON structures and while preventing experience impact of user.

The techniques described herein provide a high performance and intelligent way to find special and common parts by user history and possible future actions by a user. The machine learning methods incorporated in the flattening techniques described herein provide increased accuracy, capability, and efficiency in association with analyzing JSON data compared to some other techniques. For example, the machine learning methods provide increased accuracy, capability, and efficiency in association with identifying portions of JSON data to be flattened compared to some other techniques (e.g., SQL based search techniques).

The computing system 200 is capable of using machine learning to directly analyze JSON data (e.g., JSON data 225) and use history. The computing system 200 is capable of then flattening special parts (e.g., as identified by machine learning) and formatting common parts. The computing system 200 supports a high-performance approach for processing a JSON data structure for storage/parsing.

The computing system 200 supports techniques suitable for providing a balance between redundancy and performance. The computing system 200 uses machine learning techniques to select specific parts from all JSON attributes, providing increased accuracy, capability, and efficiency in association with identifying portions of JSON data to be flattened compared to some other techniques.

Figure 7:
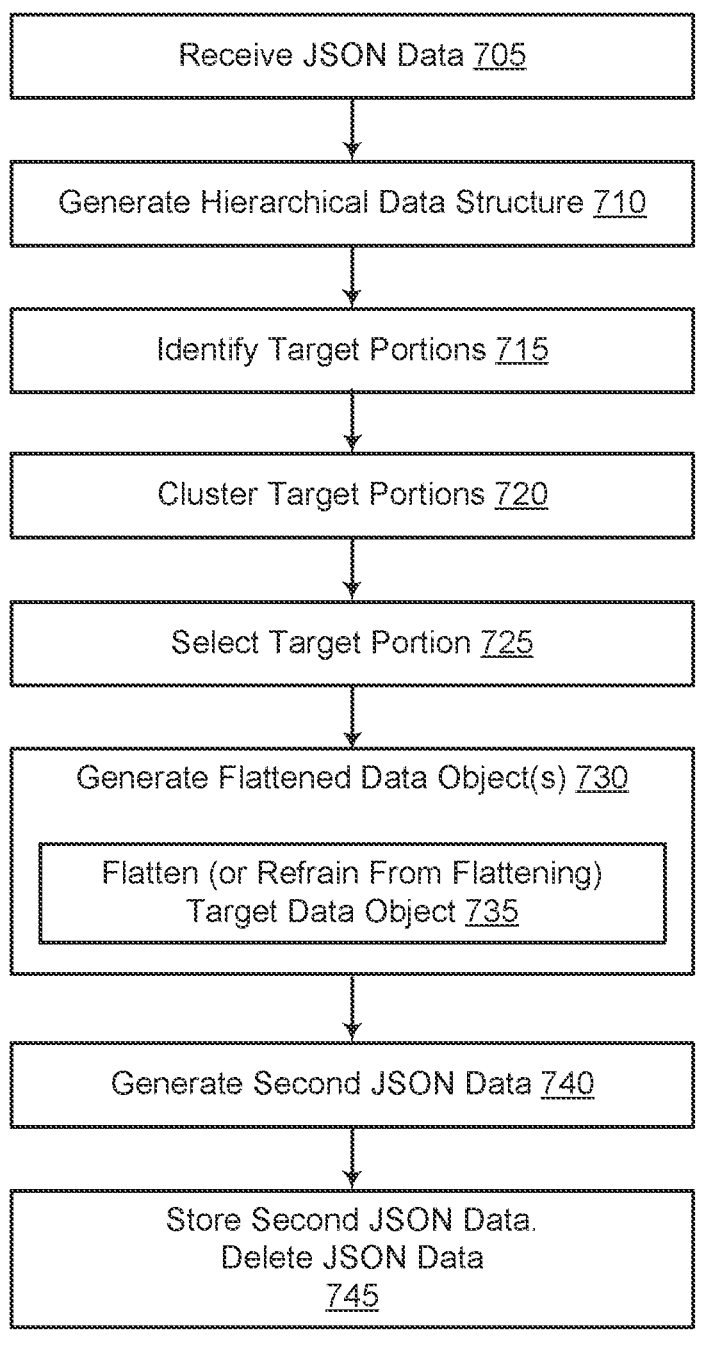
FIG. 7 illustrates an example flowchart of a method in accordance with one or more embodiments of the present disclosure.

FIG. 7 illustrates an example flowchart of a method 700 in accordance with one or more embodiments of the present disclosure.

At 705, the method 700 includes receiving first JSON data (e.g., JSON data 225), wherein the first JSON data includes a plurality of data objects (e.g., JSON objects 227).

At 710, the method 700 includes generating a hierarchical data structure (e.g., hierarchical data structure 230) based on the first JSON data.

At 715, the method 700 includes identifying one or more target portions (e.g., target subtrees 235) of the hierarchical data structure based on comparing one or more portions (e.g., subtrees 235) of the hierarchical data structure to a threshold depth level, wherein the one or more target portions of the hierarchical data structure correspond to one or more first data objects (e.g., one or more JSON objects 227) of the first JSON data.

At 720, the method 700 includes clustering a plurality of target portions included among the one or more target portions, based on a similarity among the plurality of target portions. At 730, the method 700 includes determining the similarity among the plurality of target portions based on comparing respective vectors of the plurality of target portions.

At 725, the method 700 includes selecting a target portion (e.g., a target subtree 235) of the hierarchical data structure from among the plurality of target portions, based on one or more criteria. In some aspects, selecting the target portion is based on an abnormality associated with the target portion.

At 730, the method 700 includes generating one or more flattened data objects (e.g., one or more JSON objects 264) by flattening the one or more first data objects.

In some aspects, at 735, the method 700 includes flattening a target data object (e.g., a JSON object 227) or refraining from flattening the target data object, based on one or more second criteria, wherein the target data object corresponds to the target portion of the hierarchical data structure. In some aspects, the one or more second criteria includes a threshold amount of user behavior associated with accessing one or more parts (e.g., part 229-*a*, part 229-*b*) of the target data object, modifying the one or more parts of the target data object, or both.

In some aspects, generating the hierarchical data structure includes generating respective hierarchical data structures (e.g., hierarchical data structures 230 or subtrees 235) corresponding to the plurality of data objects, one by one, in response to one or more criteria, wherein the one or more criteria includes a threshold temporal period.

At 740, the method 700 includes generating, based on the first JSON data, second JSON data (e.g., JSON data 260). In some aspects, the second JSON data includes the one or more flattened data objects (e.g., JSON objects 262), where the one or more flattened data objects correspond to one or more first data objects (e.g., one or more JSON objects 227) of the plurality of data objects of the first JSON data and are absent a hierarchical structure. In some aspects, the second JSON data includes one or more non-flattened data objects (e.g., JSON objects 264), where the one or more non-flattened data objects correspond to one or more second data objects (e.g., one or more other JSON objects 227) of the plurality of data objects of the first JSON data.

In some aspects, generating the one or more flattened data objects includes generating least a first flattened data object and a second flattened data object according to a format common to the first flattened data object and the second flattened data object.

In some aspects, the method 700 includes providing the first JSON data to one or more machine learning models (e.g., associated with machine learning network 215), wherein generating the second JSON data is based on processing the first JSON data using the one or more machine learning models.

At 745, the method 700 includes storing the second JSON data to a JSON data store (e.g., JSON data store 220) and deleting the first JSON data from the JSON data store.

In the descriptions of the flowcharts herein, the operations may be performed in a different order than the order shown, or the operations may be performed in different orders or at different times. Certain operations may also be left out of the flowcharts, one or more operations may be repeated, or other operations may be added to the flowcharts.

Various embodiments are described herein with reference to the related drawings. Alternative embodiments can be devised without departing from the scope of the present disclosure. Various connections and positional relationships (e.g., over, below, adjacent, etc.) are set forth between elements in the following description and in the drawings. These connections and/or positional relationships, unless specified otherwise, can be direct or indirect, and the present disclosure is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the present disclosure may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "example" is used herein to mean "serving as an example, instance or illustration." Any embodiment or design described herein as "example" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of +8% or 5%, or 2% of a given value.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:

receiving first JavaScript Object Notation (JSON) data, wherein the first JSON data comprises a plurality of data objects each comprising a key-value pair; and generating, based on processing the first JSON data and user behavior associated with the first JSON data using one or more machine learning models, second JSON data comprising:

one or more flattened data objects, wherein the one or more flattened data objects correspond to one or more first data objects of the plurality of data objects of the first JSON data and are absent a hierarchical structure; and one or more non-flattened data objects, wherein the one or more non-flattened data objects correspond to one or more second data objects of the plurality of data objects of the first JSON data;

storing the second JSON data to a JSON data store; and deleting the first JSON data from the JSON data store, wherein generating the second JSON data comprises:

flattening the one or more first data objects based on comparing respective first amounts of user behavior associated with the one or more first data objects to a threshold amount of user behavior, wherein the threshold amount of user behavior comprises a threshold frequency of user modifications with respect to a data object; and refraining from flattening the one or more second data objects based on comparing respective second amounts of user behavior associated with the one or more second data objects to the threshold amount of user behavior, wherein flattening the one or more first data objects and refraining from flattening the one or more second data objects are further based on balancing:

a first redundancy associated with the plurality of data objects comprised in the first JSON data with respect to a target redundancy, wherein the first redundancy is based on a repetition of data objects comprised among the plurality of data objects; and a first processing complexity associated with the plurality of data objects comprised in the first JSON data with respect to a target processing complexity, wherein the first processing complexity is based on parsing or traversing the plurality of data objects, wherein based on the flattening of the one or more first data objects and the refraining from flattening the one or more second data objects:

a second redundancy associated with a second plurality of data objects comprised in the second JSON data satisfies the target redundancy, wherein the second redundancy is different from the first redundancy; and a second processing complexity associated with parsing or traversing the second plurality of data objects comprised in the second JSON data satisfies the target processing complexity, wherein the second processing complexity is different from the first processing complexity.

2. The computer-implemented method of claim 1, further comprising:

generating a hierarchical data structure based on the first JSON data;

identifying one or more target portions of the hierarchical data structure based on comparing one or more portions of the hierarchical data structure to a threshold depth level, wherein the one or more target portions of the hierarchical data structure correspond to the one or more first data objects; and generating the one or more flattened data objects by flattening the one or more first data objects.

3. The computer-implemented method of claim 2, further comprising:

clustering a plurality of target portions included among the one or more target portions, based on a similarity among the plurality of target portions;

selecting a target portion of the hierarchical data structure from among the plurality of target portions, based on one or more criteria; and flattening a target data object or refraining from flattening the target data object, based on one or more second criteria, wherein the target data object corresponds to the target portion of the hierarchical data structure.

4. The computer-implemented method of claim 3, further comprising:

determining the similarity among the plurality of target portions based on comparing respective vectors of the plurality of target portions.

5. The computer-implemented method of claim 3, wherein selecting the target portion is based on an abnormality associated with the target portion.

6. The computer-implemented method of claim 1, wherein:

the threshold amount of user behavior is associated with;

a user accessing one or more parts of a respective data object comprising a respective key-value pair, and the user modifying the one or more parts of the respective data object.

7. The computer-implemented method of claim 2, wherein:

generating the hierarchical data structure comprises generating respective hierarchical data structures corresponding to the plurality of data objects, one by one, in response to one or more criteria, wherein the one or more criteria comprises a threshold temporal period.

8. The computer-implemented method of claim 1, wherein generating the one or more flattened data objects comprises generating least a first flattened data object and a second flattened data object according to a format common to the first flattened data object and the second flattened data object.

9. The computer-implemented method of claim 1, further comprising:

providing the first JSON data to one or more machine learning models, wherein generating the second JSON data is based on processing the first JSON data using the one or more machine learning models.

10. A computing system having a memory having program instructions and one or more processors for executing the program instructions, the program instructions controlling the one or more processors to perform operations comprising:

receiving first JavaScript Object Notation (JSON) data, wherein the first JSON data comprises a plurality of data objects each comprising a key-value pair; and generating, based on the first JSON data, second JSON data comprising:

one or more flattened data objects, wherein the one or more flattened data objects correspond to one or more first data objects of the first JSON data and are absent a hierarchical structure; and one or more non-flattened data objects, wherein the one or more non-flattened data objects correspond to one or more second data objects of the first JSON data;

storing the second JSON data to a JSON data store; and deleting the first JSON data from the JSON data store, wherein generating the second JSON data comprises:

flattening the one or more first data objects based on comparing respective first amounts of user behavior associated with the one or more first data objects to a threshold amount of user behavior, wherein the threshold amount of user behavior comprises a threshold frequency of user modifications with respect to a data object; and refraining from flattening the one or more second data objects based on comparing respective second amounts of user behavior associated with the one or more second data objects to the threshold amount of user behavior, wherein flattening the one or more first data objects and refraining from flattening the one or more second data objects are further based on balancing:

a first redundancy associated with the plurality of data objects comprised in the first JSON data with respect to a target redundancy, wherein the first redundancy is based on a repetition of data objects comprised among the plurality of data objects; and a first processing complexity associated with the plurality of data objects comprised in the first JSON data with respect to a target processing complexity, wherein the first processing complexity is based on parsing or traversing the plurality of data objects, wherein based on the flattening of the one or more first data objects and the refraining from flattening the one or more second data objects:

a second redundancy associated with a second plurality of data objects comprised in the second JSON data satisfies the target redundancy, wherein the second redundancy is different from the first redundancy; and a second processing complexity associated with parsing or traversing the second plurality of data objects comprised in the second JSON data satisfies the target processing complexity, wherein the second processing complexity is different from the first processing complexity.

11. The computing system of claim 10, wherein the program instructions control the one or more processors to perform further operations comprising:

generating a hierarchical data structure based on the first JSON data;

identifying one or more target portions of the hierarchical data structure based on comparing one or more portions of the hierarchical data structure to a threshold depth level, wherein the one or more target portions of the hierarchical data structure correspond to the one or more first data objects of the first JSON data; and generating the one or more flattened data objects by flattening the one or more first data objects.

12. The computing system of claim 11, wherein the program instructions control the one or more processors to perform further operations comprising:

clustering a plurality of target portions included among the one or more target portions, based on a similarity among the plurality of target portions;

selecting a target portion of the hierarchical data structure from among the plurality of target portions, based on one or more criteria; and flattening a target data object or refraining from flattening the target data object, based on one or more second criteria, wherein the target data object corresponds to the target portion of the hierarchical data structure.

13. The computing system of claim 12, wherein the program instructions control the one or more processors to perform further operations comprising:

determining the similarity among the plurality of target portions based on comparing respective vectors of the plurality of target portions.

14. The computing system of claim 12, wherein selecting the target portion is based on an abnormality associated with the target portion.

15. The computing system of claim 10, wherein:

the threshold amount of user behavior is associated with:

a user accessing one or more parts of a respective data object comprising a respective key-value pair, and the user modifying the one or more parts of the respective data object.

16. The computing system of claim 11, wherein:

generating the hierarchical data structure comprises generating respective hierarchical data structures corresponding to the plurality of data objects, one by one, in response to one or more criteria, wherein the one or more criteria comprises a threshold temporal period.

17. The computing system of claim 10, wherein generating the one or more flattened data objects comprises generating at least a first flattened data object and a second flattened data object according to a format common to the first flattened data object and the second flattened data object.

18. The computing system of claim 10, wherein the program instructions control the one or more processors to perform further operations comprising:

providing the first JSON data to one or more machine learning models, wherein generating the second JSON data is based on processing the first JSON data using the one or more machine learning models.

19. A computer program product comprising a computer readable storage medium having program instructions embodied therewith, the program instructions executable by one or more processors to cause the one or more processors to perform operations comprising:

receiving first JavaScript Object Notation (JSON) data, wherein the first JSON data comprises a plurality of data objects each comprising a key-value pair; and generating, based on the first JSON data, second JSON data comprising:

one or more flattened data objects, wherein the one or more flattened data objects correspond to one or more first data objects of the first JSON data and are absent a hierarchical structure; and one or more non-flattened data objects, wherein the one or more non-flattened data objects correspond to one or more second data objects of the first JSON data;

storing the second JSON data to a JSON data store; and deleting the first JSON data from the JSON data store, wherein generating the second JSON data comprises:

flattening the one or more first data objects based on comparing respective first amounts of user behavior associated with the one or more first data objects to a threshold amount of user behavior, wherein the threshold amount of user behavior comprises a threshold frequency of user modifications with respect to a data object; and refraining from flattening the one or more second data objects based on comparing respective second amounts of user behavior associated with the one or more second data objects to the threshold amount of user behavior, wherein flattening the one or more first data objects and refraining from flattening the one or more second data objects are further based on balancing:

a first redundancy associated with the plurality of data objects comprised in the first JSON data with respect to a target redundancy, wherein the first redundancy is based on a repetition of data objects comprised among the plurality of data objects; and a first processing complexity associated with the plurality of data objects comprised in the first JSON data with respect to a target processing complexity, wherein the first processing complexity is based on parsing or traversing the plurality of data objects, wherein based on the flattening of the one or more first data objects and the refraining from flattening the one or more second data objects:

a second redundancy associated with a second plurality of data objects comprised in the second JSON data satisfies the target redundancy, wherein the second redundancy is different from the first redundancy; and a second processing complexity associated with parsing or traversing the second plurality of data objects comprised in the second JSON data satisfies the target processing complexity, wherein the second processing complexity is different from the first processing complexity.

* * * * *